United States Patent Office 3,419,536
Patented Dec. 31, 1968

---

3,419,536
POLYMERS CONTAINING POLYCYANOTETRA-HYDROFURAN RINGS AND THE PREPARATION THEREOF
William Joseph Linn, Wilmington, Del., assignor to E. I. du Pont de Nemours and Company, Wilmington, Del., a corporation of Delaware
No Drawing. Original application Sept. 28, 1962, Ser. No. 227,070, now Patent No. 3,317,567, dated May 2, 1967. Divided and this application Mar. 30, 1967, Ser. No. 626,922
13 Claims. (Cl. 260—85.1)

ABSTRACT OF THE DISCLOSURE

Modification of unsaturated polymers by reaction of a polycyanoethylene oxide with 1–50% of the unsaturation at temperatures of 80–250° C. Molded objects and films can be produced from the modified polymers.

---

CROSS-REFERENCE TO RELATED APPLICATION

This appplication is a division of my copending coassigned application Ser. No. 227,070, filed Sept. 28, 1962, now U.S. Patent 3,317,567.

FIELD OF THE INVENTION

This invention relates to novel polymers containing polycyanotetrahydrofuran rings and to the process for their preparation.

SUMMARY OF THE INVENTION

This invention is directed to modified polymers each consisting of:

a substrate precursor polymer contining, before modification, a plurality of initial sites of carbon-carbon double bond saturation

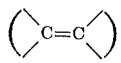

either ethylenic or aromatic, and
containing pendant, after modification, from 1–50% of the initial sites of the carbon-carbon double bond unsaturation, attached to each of the carbons therein by one bond and forming therewith a polycyanotetrahydrofuran ring, a divalent radical of the formula

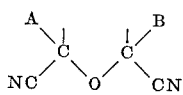

wherein
A is hydrogen, CN, perfluoroalkyl of up to 13 carbons, p-XH$_4$C$_6$—, i.e.,

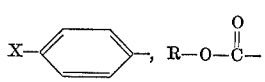

or R— where R— is alkyl of up to 18 carbons and X is hydrogen, halogen, nitro, R— or R—O— where R— is as defined above; and
B is cyano, perfluoroalkyl of up to 13 carbons or

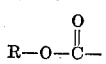

where R— is as defined above.

These modified polymers, which generally melt or soften at higher temperatures and are more resistant to organic solvents than the precursor polymers, can be fabricated into molded objects and films.

DESCRIPTION OF THE PREFERRED EMBODIMENTS

Modification of polymers, especially commercially available polymers and resins, is a means of producing new polymers having improved properties compared to the precursor polymers. For example, the modified polymer can have higher or lower melting points or melting ranges, requiring different fabrication conditions. Improved solubility characteristics sometimes are observed. Modification of a polymer is a method of introducing reactive sites into polymer chain.

The polymers of this invention may be regarded as adducts of: (a) a polycyanoethylene oxide of the formula

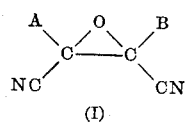

(I)

wherein A and B are as defined above and (b) a polymeric compound having aromatic or ethylenic unsaturation

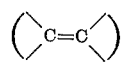

Preferred are the modified polymers where A and B are cyano and from about 1% to about 30% of the reactive carbon-carbon double bonds in the polymer precursor have reacted to form tetrahydrofuran rings.

Polycyanoethylene oxides react with unsaturated polymers containing either ethylenic or aromatic unsaturation or with polymers containing both ethylenic and aromatic unsaturation. The modification process in polymers containing ethylenic or aromatic unsaturation using poly(1,3-butadiene) and polystyrene as precursor substrates is represented by the equation:

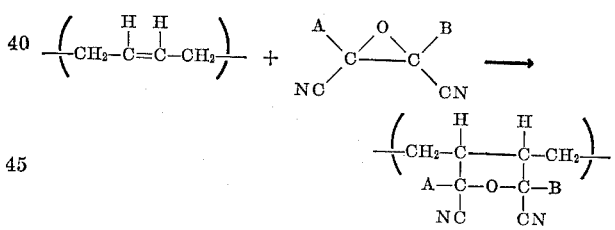

or by the equation

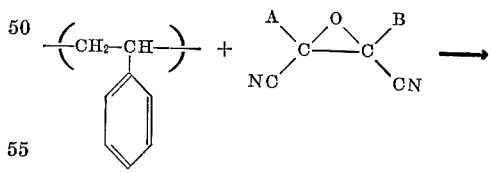

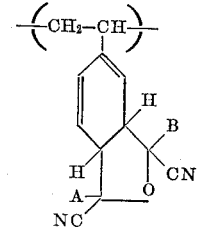

and isomers.

When a precursor substrate has both ethylenic and aromatic unsaturation, such as a butadiene-styrene copolymer, both types of unsaturation are sites for the formation of the tetrahydrofuran rings.

The products of this inveniton are prepared by reacting a polycyanoethylene oxide of the formula

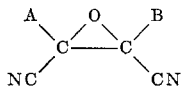

with 1–50% of the unsaturation of a precursor polymer. Polymers which can be used include: poly(1,3-butadiene), poly(2-chloro-1,3-butadiene), poly(2-bromo-1,3 - butadiene), polystyrene, polyisoprene, poly(2,4 - hexadiene), poly(2,3-difluoro-1,3-butadiene), ethylene/1,5-hexadiene copolymers, styrene/1,3-butadiene copolymer or acrylonitrile/1,3-butadiene copolymer. The process is conducted at elevated temperatures but is conveniently conducted at temperatures of about 80° C. to about 250° C. and preferably at temperatures of about 100° C. to about 200° C.

Polymers which can be modified by reaction with a polycyanoethylene oxide preferably are the various commercially available resins including polystyrene, poly(2-chloro - 1,3 - butadiene), poly(1,3 - butadiene), poly(isoprene), styrene/1,3-butadiene copolymers and acrylonitrile/1,3-butadiene copolymers. Each of the resins is available in various modifications having slightly different molecular weights, molding characteristics, melting ranges and viscosities. The process of this invention is equally applicable to the various forms of these commercially available resins, i.e., the commercially available polymers of differing molecular weight or those possessing different fabrication characteristics.

Polycyanoethylene oxides of the foregoing description can be obtained by procedures described in U.S. 3,238,228. Among these polycyanoethylene oxides, tetracyanoethylene oxide is especially preferred for the preparation of the polycyanotetrahydrofuran-modified polymers because the olefin from which this oxide is prepared, i.e., tetracyanoethylene, is available commercially and is therefore more accessible the other polycyanoolefins. Because of their greater accessibility, perfluoroalkyl groups containing up to 13 carbons each are preferred in the polycyanoepoxide starting materials having such substituents. Included in the definition of perfluoroalkyl are trifluoromethyl, perfluoroethyl, perfluoropropyl, perfluorobutyl, perfluorodecyl, perfluorododecyl, perfluorotridecyl and the like.

The reaction pressure is not critical and can be in the range from below to above atmospheric pressure. Accordingly, the reaction is accomplished in a reaction vessel suited to the chosen mode of operation. Although it is advantageous to carry out the reaction in a closed vessel under pressure which is the autogenous pressure of the reactants, a reactor which is not closed pressurewise against the atmosphere can also be used. However, it is important to prevent the escape of any reactant from the sphere of reaction, whether in a closed or open reaction vessel. When the vessel is otherwise open to the atmosphere, the reactants are confined by use of any suitable means, such as a solvent and/or a reflux condenser.

The reaction time is not critical and will ordinarily vary from about one hour to several days depending on the specific temperature and pressure that are employed, longer times being needed to obtain substantially complete reaction at lower temperatures and pressures.

A reaction medium is unnecessary but can be used to advantage; and the medium can be an excess of a nonreactive solvent such as 1,2-dibromoethane, or a potentially reactive solvent that is less reactive with polycyanoethylene epoxides than the chosen unsaturated polymer, e.g., toluene can be used as a solvent in the reaction of tetracyanoethylene oxide with an ethylenically unsaturated polymer. The reaction can be conducted on a heated rubber mill.

The proportions of polycyanoethylene oxide and unsaturated polymer are not critical, and a stoichiometric excess of either can be used. It is not unusual to use an excess of the unsaturated polymer. In general, the amount of the polycyanoethylene oxide reacting with the precursor polymer is less than the amount used.

When the unsaturated polymer has more than one carbon-carbon double bond, the bonds being cumulated or conjugated, only one of the double bonds will normally react with the epoxide even when the epoxide is present in stoichiometric excess. However, when the unsaturated reactant has a plurality of aliphatic double bonds that are noncumulated or nonconjugated, each of such double bonds can react simultaneously with separate molecules of the epoxide, e.g., unsaturated polymers such as polybutadiene can react at any or all of the separate unsaturated centers. Hence all noncumulated and nonconjugated aliphatic bonds and one each of a series of cumulated or conjugated aliphatic double bonds in a polyunsaturated reactant are reactive.

The new polymers of this invention will vary in physical properties according to the nature of the original polyunsaturated polymer and the extent to which the reactive double bonds are converted to polycyanotetrahydrofuran units. Generally, such products are higher melting and less soluble than the parent polymers.

As was noted above, the epoxide reactants used in the process of this invention are prepared by the method disclosed and claimed in U.S. 3,238,228. This method consists of reacting a compound of the formula

wherein A and B are as defined above, with aqueous hydrogen peroxide (at least 3% $H_2O_2$ by weight, conveniently 30% by weight) in solution in a single phase, preferably at a temperature of −20 to +50° C. and a pH of 6–8. The solvent used to prepare the single phase solution of reactants is a water-miscible, inert organic liquid such as acetonitrile. A typical preparation is as follows:

A solution of 256 parts of tetracyanoethylene in 1180 parts of acetonitrile is cooled at 0° C. and 344 parts of 30% hydrogen peroxide is added all at once. A transient violet color appears which soon fades to yellow. The solution is stirred for five minutes and diluted with 10,000 parts of ice water. The oil which separates soon solidifies and is collected by filtration and dried to give 200 parts (70% yield) of colorless crystals of tetracyanoethylene oxide. After recrystallization from ethylene dichloride, the product melts at 177–178° C.

The invention is illustrated in greater detail in the following examples, in which percentages and quantities of reactants (parts) are given in terms of weight unless otherwise indirected.

EXAMPLE 1

Tetracyanoethylene oxide modified polystyrene

To a solution of 10 parts of polystyrene in 540 parts of 1,2-dibromoethane was added 13.8 parts of tetra-cyanoethylene oxide dissolved in about 100 parts of 1,2-dibromoethane. The mixture was stirred and heated to remove the solvent by distillation at atmospheric pressure (B.P. of 1,2-dibromoethane 131.5° C.). The residual product was extracted with ethanol in a Soxhlet apparatus. Analysis of the dried ethanol-insoluble product showed a nitrogen content corresponding to a reaction of 10 parts of polystyrene with 2.1 parts of tetracyanoethylene oxide or to a reaction of about 15% of the unsaturation.

Analysis.—Calc'd for 10/2.1 polystyrene/tetracyanoethylene oxide: Calc'd: C, 85.0; H, 6.36; N, 6.77. Found: C, 80.8; H, 6.49; N, 6.77.

EXAMPLE 2

Tetracyanoethylene oxide modified polyisoprene (A) A blend of 15 parts of xylene-soluble raw crepe rubber (polyisoprene) and 15.2 parts of tetracyanoethylene oxide was prepared on a rubber mill having heated rolls 6" long by 2.5" in diameter. The mixture was milled 10 minutes at 58° C., 4 minutes at 100° C. and 5 minutes at 105–110° C., and was then sheeted out. The sheeted product, after extraction with methanol for two weeks in a Soxhlet apparatus, was found to be insoluble in xylene.

(B Blended mixtures of raw crepe rubber and tetracyanoethylene oxide were prepared on a rubber mill, molded sheets of the blends were made in a molding press under various conditions, tensile strength and elongation of the molded samples were determined, and elemental analyses were obtained. The data are presented in Table I, wherein:

TCNEO=weight percent tetracyanoethylene oxide blended
T° C.=molding temperature in degrees centigrade
Min.=molding time in minutes
Tensile=tensile strength in lbs. per sq. in. of cross-section
Elong.=percent elongation at break
C, H, N=percent carbon, hydrogen and nitrogen, respectively
Percent of unsaturation reacted=percent of initial unsaturation in precursor polymer which reacted with TCNEO.

dure of Example 3B to yield modified polymers containing tetrahydrofuran units and having higher-melting points and lower solubility than their respective parent polymers.

EXAMPLE 4

Tetracyanoethylene oxide modified ethylene/1,5-hexadiene copolymer

An elastomeric copolymer was prepared from 8 parts of ethylene and 10 parts of 1,5-hexadiene at −20° C. with a vanadyl trichloride-titanium tetraphenoxide-diethylaluminum chloride catalyst. The polymer contained about 25% hexadiene units (estimated by infrared spectroscopic analysis), and had an inherent viscosity at 1.47 at 0.1% concentration in α-chloronaphthalene at 125° C. A solution of 3.3 parts of the copolymer (containing the equivalent of 0.02 mole of vinyl groups) and 2.9 parts (0.02 mole) of tetracyanoethylene oxide in 110 parts of chlorobenzene was heated at reflux for two hours. The reaction mixture was then cooled and poured into excess ethanol to precipitate the polymeric material, which was

TABLE I

| No. | TCNEO | T° C. | Min. | Tensile | Elong. | C | | H | | N | | Percent of Unsaturation Reacted | |
|---|---|---|---|---|---|---|---|---|---|---|---|---|---|
| | | | | | | Calc'd. | Found | Calc'd. | Found | Calc'd. | Found | Calc'd. | Found |
| 1 | 0 | 120 | 60 | 2,157 | 1,219 | | | | | | | | |
| 2 | 0 | 140 | 30 | 1,908 | 1,159 | | | | | | | | |
| 3 | 0 | 150 | 15 | 1,474 | 1,010 | 87.2 | 83.8 | 11.5 | 11.3 | 1.13 | 1.29 | 1.4 | 1.6 |
| 4 | 2.9 | 100 | 30 | 142 | 622 | | | | | | | | |
| 5 | 2.9 | 120 | 30 | 102 | 559 | | | | | | | | |
| 6 | 2.9 | 120 | 60 | | | | | | | | | | |
| 7 | 2.9 | 140 | 30 | 80 | 427 | 84.0 | 82.4 | 10.5 | 10.4 | 4.32 | 3.92 | 5.7 | 5.3 |
| 8 | 11.1 | 120 | 60 | 236 | 94 | | | | | | | | |
| 9 | 11.1 | 140 | 30 | 264 | 99 | | | | | | | | |
| 10 | 11.1 | 150 | 30 | | | | | | | | | | |
| 11 | 20 | 120 | 60 | 811 | 57 | | | | | | | | |
| 12 | 20 | 140 | 30 | 765 | 50 | 80.6 | 77.1 | 9.45 | 9.02 | 7.78 | 7.11 | 11.8 | 10.8 |
| 13 | 20 | 150 | 30 | | | | | | | | | | |

EXAMPLE 3

Tetracyanoethylene oxide modified polychloroprene (A) A blend of 25 parts of xylene-soluble polychloroprene and 40.6 parts of tetracyanoethylene oxide was prepared on a rubber mill having heated rolls 6" long by 2.5" in diameter. The mixture was milled 32 minutes at 50° C. and 15 minutes at 105–110° C., and was sheeted out at 60° C. The sheeted product, after extraction with methanol for two weeks in a Soxhlet apparatus, was found to be insoluble in xylene.

(B) Blended mixtures of polychloroprene and tetracyanoethylene oxide were prepared at 50° C. on a rubber mill and tested, as in Example 2–B. The data thus obtained are presented in Table II (the table headings have the same meaning as in Table I).

separated, washed successively with ethanol, acetone and ethanol, and dried under reduced pressure. The resultant 3.5 parts of material was elastomeric. Infrared spectroscopic analysis of the product showed a lack of absorption due to vinyl groups (found in the original copolymer at 910, 990 and 1642 cm.$^{-1}$), a moderate strong sharp absorption at 2250 cm.$^{-1}$ indicative of cyano groups, and broad bands centered at 1010, 1070 and 1220 cm.$^{-1}$ which are believed to be indicative of the tetrahydrofuran structure. The product was found to be insoluble in α-chloronaphthalene at 125° C., and pressed films were found qualitatively tougher than films of the original copolymer. Elementary analysis showed 4.8% nitrogen, corresponding to about 27 percent of the initial double bonds combined with tetracyanoethylene oxide in the treated copolymer.

TABLE II

| No. | TCNEO | T° C. | Min. | Tensile | Elong. | C | | H | | N | | Percent of Unsaturation Reacted | |
|---|---|---|---|---|---|---|---|---|---|---|---|---|---|
| | | | | | | Calc'd. | Found | Calc'd. | Found | Calc'd. | Found | Calc'd. | Found |
| 1 | 2.9 | 100 | 30 | 1,115 | 771 | | | | | | | | |
| 2 | 2.9 | 100 | 60 | | | 54.1 | 53.6 | 5.49 | 5.6 | 1.13 | 0.70 | 1.83 | 1.13 |
| 3 | 2.9 | 120 | 30 | 887 | 694 | | | | | | | | |
| 4 | 2.9 | 120 | 60 | 875 | 607 | 53.9 | 53.4 | 5.03 | 5.37 | 4.33 | 3.22 | 7.7 | 5.7 |
| 5 | 11.1 | 140 | 30 | | | | | | | | | | |
| 6 | 11.1 | 150 | 15 | 296 | 170 | | | | | | | | |
| 7 | 11.1 | 150 | 30 | 382 | 221 | 53.4 | 52.6 | 4.52 | 4.86 | 7.78 | 5.98 | 15.3 | 11.8 |
| 8 | 20 | 120 | 60 | 1,586 | 166 | | | | | | | | |
| 9 | 20 | 150 | 30 | 1,929 | 98 | | | | | | | | |

Halohydrocarbon polymers in addition to polychloroprene can be reacted according to the process of this invention. For example, polybromprene (polymeric 2-bromo-1,3-butadiene) and poly-2,3-difluorobutadiene (polymeric 2,3-difluoro-1,3-butadiene) can be reacted with a tetracyanoethylene oxide by following the proce-

EXAMPLE 5

Tetracyanoethylene oxide modified 1,3-butadiene/styrene copolymer (A) A solution of one part of butadiene/styrene copolymer having a butadiene content of 26% and 0.55 part of tetracyanoethylene oxide in 55 parts of chlorobenzene was heated at reflux for three hours. The cloudy reaction mixture was cooled and poured into an excess of ethanol. A polymeric solid was precipitated which was washed successively with acetone and ethanol. The solid was found to be swollen but insoluble in acetone, and additional tests showed it to be insoluble in a variety of polar and non-polar solvents.

(B) A butadiene/acrylonitrile copolymer having an 82% butadiene content was treated with tetracyanoethylene oxide by the procedure described in Example 5A, above. The resultant product was likewise insolubilized.

EXAMPLE 6

Tetracyanoethylene oxide modified poly (2,4-hexadiene)

A gummy elastomeric polymer was prepared from 3.5 parts of trans-trans-2,4-hexadiene in 55 parts of chlorobenzene at −30° C. with a vanadyl trichloride-diethyl-aluminum chloride catalyst. A solution of 1.9 parts of the polymer in 55 parts of chlorobenzene was heatd to 100° C., and 1.44 parts of tetracyanoethylene oxide was added. The reaction mixture was heated at reflux for 8 hours, and was then coled an diluted with excess ethanol. The resultant precipitate was washed with ethanol and dried under reduced pressure. The product was dark in color and partially insoluble in tetrahydrofuran, but the soluble portion could be cast to a dark, clear, brittle film. Infrared spectroscopic analysis showed that the treated polymer contained about 50° less trans unsaturation than the untreated polymer; and the presence in the treated polymer of bands at 1010, 1070 and 2250 cm.$^{-1}$ showed the presence of the tetracyanotetrahydrofuran grouping.

The process of this invention is applicable to copolymers having from 1–99% by weight of comonomer. These copolymers are prepared by well-known addition polymerization methods.

The procedures of Examples 1–6 can be conducted using instead of tetracyanoethylene oxide an equivalent amount of one of the polycyanoethylene oxides listed below:

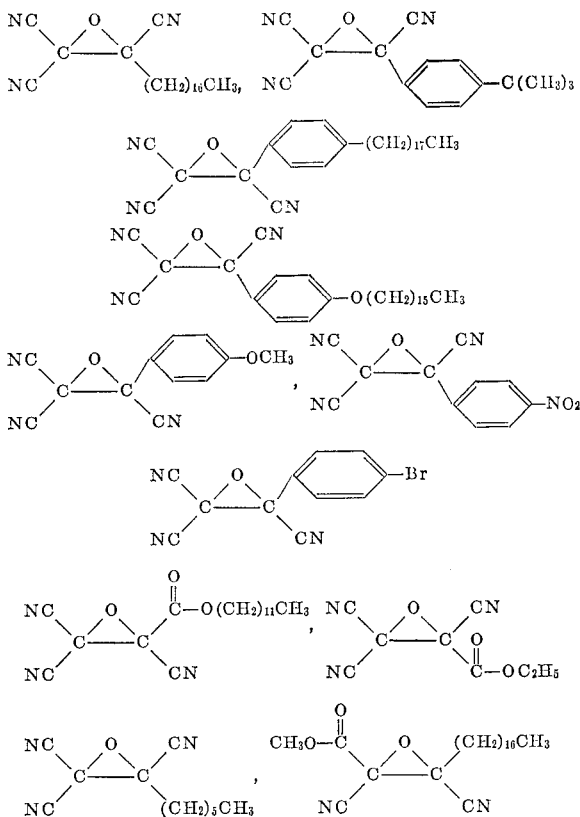

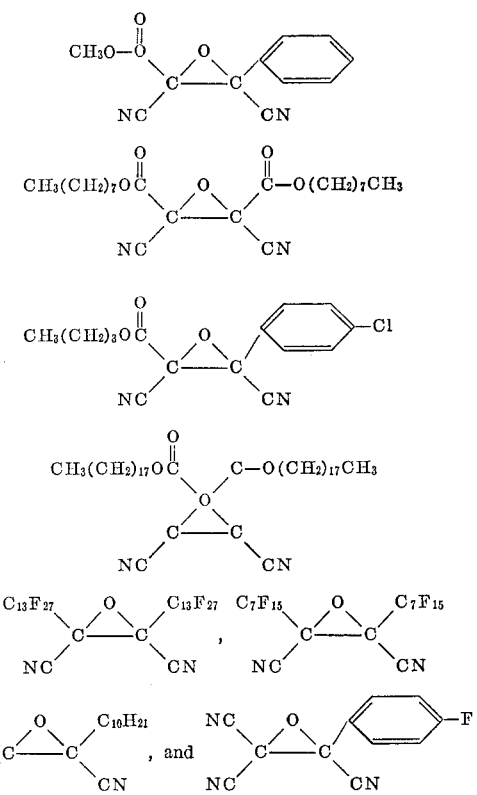

Polycyanotetrahydrofuran - substituted polymers obtained by reaction of polycyanoethylene oxides with poly-unsaturated polymers generally have higher melting points and melting ranges and lower solubility than the precursor polymers and can be used as higher melting, solvent resistant embodiments thereof. The modified polymers can be obtained in the form of waxes, or plastics which are useful for the production of molded objects such as rods or sheets or for the production of self-supporting films. Since the physical properties of the polymers vary with the amount of combined polycyanoethylene oxide (cf. Examples 2 and 3), such modified polymers are useful for a variety of specific uses according to the properties desired.

EXAMPLE A

The modified polymer prepared in Example 4 was melt-pressed at 125° C. A tough, clear, self-supporting film was obtained.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A modified polymer consisting of:
  a substrate precursor polymer containing, before modification, a plurality of initial sites of carbon-carbon double bond unsaturation

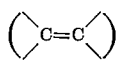

either ethylenic or aromatic, and
containing pendant, after modification, from 1–50% of the initial sites of the carbon-carbon double bond unsaturation, attached to each of the carbons therein by one bond and forming therewith a polycyanotetrahydrofuran ring, a divalent radical of the formula

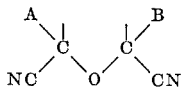

wherein
A is hydrogen, CN, perfluoroalkyl of up to 13 carbons, $p=XH_4C_6-$, i.e.,

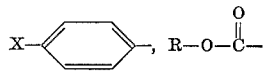

or R— where R— is alkyl of up to 18 carbons and X is hydrogen, halogen, nitro, R— or R—O— where R— is as defined above; and
B is cyano, perfluoroalkyl of up to 13 carbons or

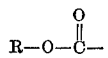

where R— is as defined above.

2. A modified polymer of claim 1 wherein the substrate polymer is poly(1,3-butadiene), poly(2-chloro-1,3-butadiene), poly(2-bromo-1,3-butadiene), polystyrene, polyisoprene, poly(2,4-hexadiene), poly(2,3-difluoro-1,3-butadiene), an ethylene/1,5-hexadiene copolymer, a styrene/1,3-butadiene copolymer or an acrylonitrile/1,3-butadiene copolymer.

3. A modified polystyrene polymer of claim 1.

4. A modified poly(2-chloro-1,3-butadiene) polymer of claim 1.

5. A modified styrene/1,3-butadiene copolymer of claim 1.

6. A modified polyisoprene polymer of claim 1.

7. A self-supporting film formed from a modified polymer of claim 1.

8. The tetracyanoethylene oxide modified polymer of claim 3 wherein pendant from about 1–20% of the initial sites of carbon-carbon double bond unsaturation are tetracyanotetrahydrofuran rings.

9. A tetracyanoethylene oxide modified polymer of claim 4 wherein pendant from about 1 to 50% of the initial sites of carbon-carbon double bond unsaturation are tetracyanotetrahydrofuran rings.

10. A tetracyanoethylene oxide modified polymer of claim 5 wherein pendant from about 1 to 30% of the initial sites of carbon-carbon double bond unsaturation are tetracyanotetrahydrofuran rings.

11. A tetracyanoethylene oxide modified polymer of claim 6 wherein pendant from about 1 to 50% of the initial sites of carbon-carbon double bond unsaturation are tetracyanotetrahydrofuran rings.

12. A self-supporting film formed from a modified polymer of claim 8.

13. The process for preparing a polymer of claim 1 comprising heating at a temperature of 80–250° C. a mixture of
(a) a polycyanoethylene oxide of the formula

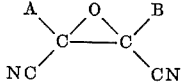

wherein A and B are as defined in claim 1; and
(b) a polymer selected from
poly(1,3-butadiene),
poly(2-chloro-1,3-butadiene),
poly(2-bromo-1,3-butadiene),
polystyrene, polyisoprene,
poly(2,4-hexadiene),
poly(2,3-difluoro-1,3-butadiene),
an ethylene/1,5-hexadiene copolymer,
a styrene/1,3-butadiene copolymer or
an acrylonitrile/1,3-butadiene copolymer.

No references cited.

JOSEPH L. SCHOFER, *Primary Examiner.*

L. EDELMAN, *Assistant Examiner.*

U.S. Cl. X.R.

260—83.3, 88.2, 92.3, 93.5, 94.7.

PO-1050
(5/69)

UNITED STATES PATENT OFFICE
CERTIFICATE OF CORRECTION

Patent No. 3,419,536          Dated December 31, 1968

Inventor(s)    William Joseph Linn

It is certified that error appears in the above-identified patent and that said Letters Patent are hereby corrected as shown below:

Column 9, line 9, Claim 1, "$p=XH_4C_6-$" should read -- $p-XH_4C_6-$ --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents